United States Patent [19]

Mizumoto et al.

[11] Patent Number: 5,541,022
[45] Date of Patent: Jul. 30, 1996

[54] COMPOSITE ANODE FOR NONAQUEOUS SECONDARY BATTERY AND METHOD FOR PRODUCING THE SAME

[75] Inventors: Mamoru Mizumoto, Katsuta; Hidetoshi Honbo; Tatsuo Horiba, both of Hitachi, all of Japan

[73] Assignee: Hitachi, Ltd., Tokyo, Japan

[21] Appl. No.: 346,218

[22] Filed: Nov. 22, 1994

Related U.S. Application Data

[63] Continuation-in-part of Ser. No. 80,102, Jun. 23, 1993, abandoned.

[30] Foreign Application Priority Data

Aug. 6, 1992 [JP] Japan ................................ 4-229454

[51] Int. Cl.$^6$ .................................................. H01M 4/02
[52] U.S. Cl. .................... 429/218; 429/194; 429/212; 429/232
[58] Field of Search .................... 429/194, 212, 429/218, 232

[56] References Cited

U.S. PATENT DOCUMENTS

| | | | |
|---|---|---|---|
| 4,945,014 | 7/1990 | Miyabayashi et al. | 429/218 |
| 4,959,281 | 9/1990 | Nishi et al. | 429/194 |
| 5,028,500 | 7/1991 | Fong et al. | 429/194 |

*Primary Examiner*—M. Nuzzolillo
*Attorney, Agent, or Firm*—Antonelli, Terry, Stout & Kraus

[57] ABSTRACT

A composite anode includes particles of an alkali metal alloy, a carbonaceous material powder and a binder and used for nonaqueous secondary batteries in which an alkali metal is used as an anode active material and a solution of an electrolyte in an organic solvent is used as an electrolyte solution, wherein the carbonaceous material powder contains oxygen atoms and the oxygen content is in the range of 1 to 5% by weight. A method for producing this composite anode includes the steps of mixing a solution of a binder comprising a copolymer of monomers mainly composed of olefins in an aromatic solvent with the alkali metal alloy particles and the carbonaceous material powder, coating the mixture on an electrode substrate and molding the coated substrate.

7 Claims, 1 Drawing Sheet

COMPOSITE ANODE FOR NONAQUEOUS SECONDARY BATTERY AND METHOD FOR PRODUCING THE SAME

CROSS-REFERENCE TO RELATED APPLICATION

This application is a continuation-in-part application of Ser. No. 080,102, filed on Jun. 23, 1993, now abandoned.

BACKGROUND OF THE INVENTION

The present invention relates to a composite anode used for nonaqueous secondary batteries and particularly to a composite anode used for nonaqueous secondary batteries which is formed using a pulverized alkali metal alloy, a carbonaceous material powder and a polymeric binder and a method for producing the same.

The improvement of charge-discharge cycle life is the most important task to be attained in the nonaqueous secondary batteries in which an alkali metal is used as an anode active material and a solution prepared by dissolving an electrolyte in an organic solvent is used as an electrolyte solution. In order to inhibit the side reaction between the electrolyte solution and the active alkali metal precipitated on the anode upon charging which is a factor governing the charge-discharge cycle life, it is necessary to select the optimum combination of the anode and the electrolyte system. Accordingly, as for the electrolyte system, development of a mixed solvent system and an electrolyte solution excellent in the stability on the anode or research on the additives for inhibiting the side reactions has been attempted. As for the anode materials, in order to prevent the active alkali metals from precipitating on the surface of the anode at the time of charging, it has been studied to use alloys of alkali metals or carbon materials as the anode materials to rapidly diffuse into the alloy or carbon the alkali metal precipitated by the charging, thereby to inhibit the reaction between the electrolyte solution and the alkali metal.

However, when novel anode materials are developed, the problem in use of the carbon materials is that they are low in capacity density per volume of the electrode. In the case of using alkali metal alloys, when the anode utilization is enhanced, the alkali metal alloys undergo change in volume due to the charge-discharge and repetition of the charge-discharge results in collapse of the electrodes to cause decrease in the charge-discharge cycle life.

In order to solve these problems, hitherto there have been proposed a method of using a composite of an alkali metal alloy and a conductive polymer (Japanese Patent Kokai (Laid-Open) No. 60-262351) and a method of forming the electrode using a PTFE resin as a binder (Japanese Patent Kokai (Laid-Open) No. 60131776).

However, these methods suffer from the problems that, for example, conductive polymers release alkali metals at the time of discharging to cause decrease of conductivity and sufficient interparticle bonding effect cannot be obtained because of their small specific surface area of about 10 $m^2/g$ and when a PTFE resin is used as a binder, this resin reacts with the alkali metal to bring about deterioration of the anode.

SUMMARY OF THE INVENTION

The object of the present invention is to solve the above problems and to provide a composite anode for nonaqueous secondary batteries excellent in the charge-discharge cycle characteristics which is made of an anode material comprising an alkali metal alloy and a carbonaceous material powder to which a binder is added.

The present invention for attaining the above object relates to a composite anode comprising a pulverized alkali metal alloy, a carbonaceous material powder and a binder for nonaqueous secondary batteries in which an alkali metal is used as the anode active material and a solution of an electrolyte in an organic solvent is used as an electrolyte solution, characterized in that said carbonaceous material powder contains oxygen atoms and the oxygen content is 0.1 to 5% by weight.

The present invention for attaining another object of the present invention relates to a method for producing a composite anode comprising a pulverized alkali metal alloy, a carbonaceous material powder and a binder for nonaqueous secondary batteries in which an alkali metal is used as the anode active material and a solution of an electrolyte in an organic solvent is used as an electrolyte solution, characterized by mixing a solution of a binder comprising a copolymer of monomers mainly composed of olefins in an aromatic solvent with the pulverized alkali metal and the carbon or carbonaceous material powder containing 0.1 to 5% by weight of oxygen, coating the mixture on a substrate for electrode and molding the thus coated substrate.

DETAILED DESCRIPTION OF THE INVENTION

Figure 1:
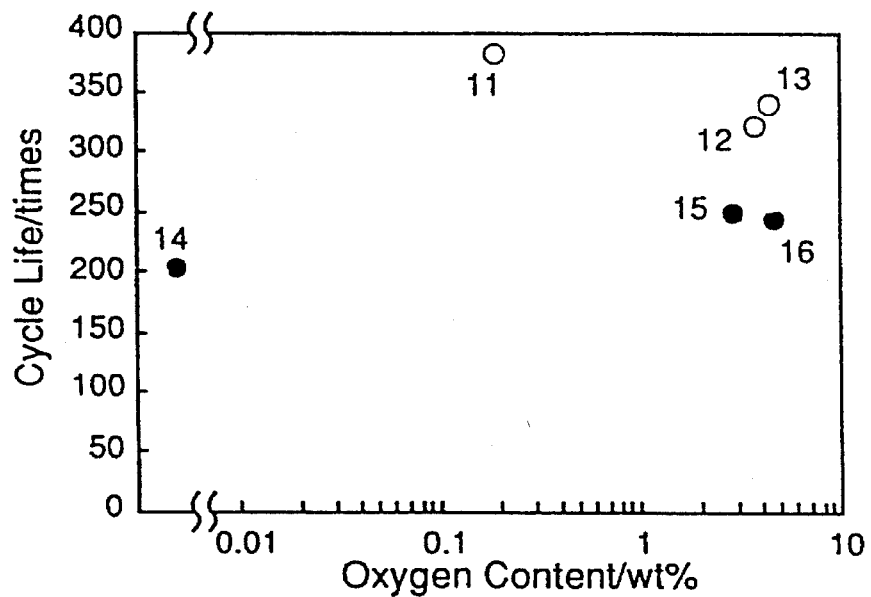
FIG. 1 is a graph showing the dependence of charge-discharge cycle life of the composite anode on the oxygen content of the carbonaceous material.

In FIG. 1, reference numeral 11 denotes the results of Example 1, 12 the results of Example 4, 13 the results of Example 5, 14 the results of Comparative Example 2, 15 the results of Comparative Example 3 and 16 the results of Comparative Example 4.

Figure 2:
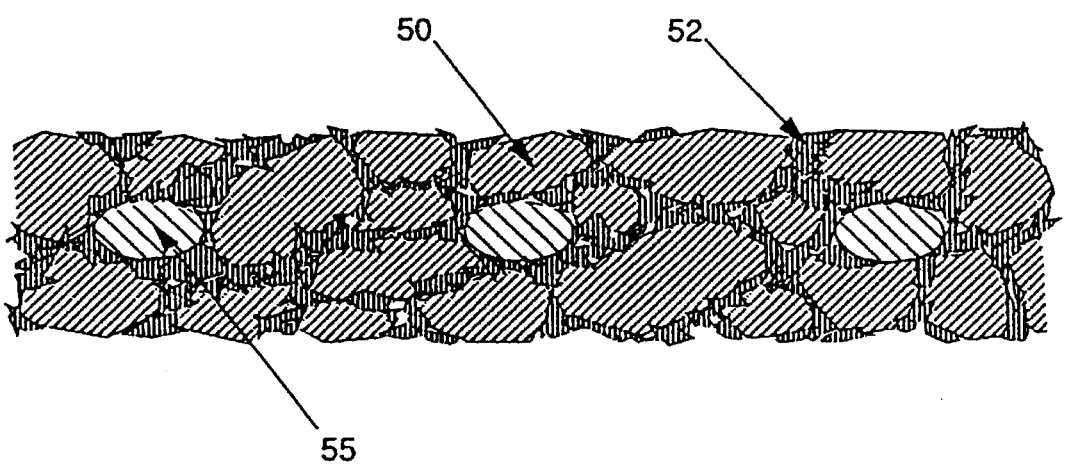
FIG. 2 is a schematic view of the composite anode.

In FIG. 2, reference numeral 50 denotes the alkali metal alloy particles serving as active material which are surrounded by the carbonaceous material particles 52. Current collectors are designated by reference numeral 55.

DESCRIPTION OF THE INVENTION

The present invention is explained in detail below.

First, effects of binders and conductive materials expected to strengthen the bonding between the particles of active materials in the composite anode formed by combining the alkali metal alloy particles and the conductive materials have been investigated on various materials. As for the binder, it has been found that copolymers of olefins such as ethylene and propylene as main components are the most excellent as hydrocarbon polymer materials containing no hetero atoms in order to inhibit the reaction with the alkali metal which is an anode active material.

Since the alkali metal alloys are generally brittle, there is the problem in casting them into a plate-type electrode. For making a disc electrode used in coin-type batteries, press molding can be employed. However, when a spirally wound electrode is made as used for cylindrical batteries, there are serious difficulties in the technique to make electrodes in both cases of press molding a powdered alloy and of casting the alloy into a plate. The copolymers mainly composed of olefins such as ethylene and propylene are soluble in aromatic solvents. Therefore, the resulting solution is mixed with an alkali metal alloy and carbonaceous powders to prepare a paste and electrodes can be produced by easily coating the paste on a current collector by the method similar to the method for producing electrodes used in conventional aqueous solution type secondary batteries. The thus produced composite anode can have a larger surface area than the plate-type electrodes since the alkali metal alloy which is an active material is used in the form of powder and as a result, the discharge rate characteristics can be improved.

On the other hand, regarding the conductive materials, the composition of the alkali metal alloy which is an active material, namely, $M_1/M_2$ ratio ($M_1$ denotes an alkali metal and $M_2$ denotes another metal constituting the alloy) changes with charging-discharging to cause expansion-contraction of the particles of the alkali metal alloy to lose the electrical contact between the alloy particles. As shown in FIG. 2, spaces formed between the alkali metal alloy particles 50 are filled with the carbonaceous material particles 52. In order to inhibit the loss of the electrical contact due to the expansion-contraction, it is necessary to impart the binding effect between the particles. In order to maintain the electrical contact between the particles, such materials of low bulk density are necessary which have a high conductivity and can be efficiently filled in the space between the particles of the alkali metal alloy to attain effective contact between the particles and moderate the change in volume of the alloy particles. In order to give the filled structure as shown in FIG. 2 the size of the carbonaceous material particles should be smaller than that of the alkali metal alloy particles. Generally, the thickness of the anode used is in the range of 0.1 to 1.0 mm. The size of the alloy particles is desirably 200 mesh or under, i.e., 74 μm or less, in order to form electrolyte-penetrating pores in the anode of the above-mentioned thickness. The size of the carbonaceous material particles is desirably smaller than that of the alloy particles, e.g., 32 mesh or under, i.e. 44 μm or less.

It has been found that as such materials carbonaceous materials are superior to the conductive polymer materials mentioned in Japanese Patent Kokai (Laid-Open) No. 60-262351. In making an electrode by dissolving a copolymer mainly composed of ethylene and propylene in an aromatic solvent and then adding the resulting solution to a mixture of alkali metal alloy particles and carbonaceous powders to prepare a paste, there is the possibility that a part of the copolymer mainly composed of ethylene and propylene which is a binder deposits on the alkali metal alloy particles as an active material to hinder the plating-stripping reaction of the alkali metal. It is possible to inhibit the deposition of the copolymer mainly composed of ethylene and propylene on the alkali metal alloy particles by using a carbonaceous material of relatively large specific surface area.

In the present invention, it has been found that the liquid binder overspreads on the surfaces of the particles in a very thin film and/or permeates into the micropores of the bodies of the particles. The carbonaceous material particles and the alloy particles bond to each other via the binder. If the surface area of the carbonaceous material particles is larger than that of the alloy particles, then the binder collects on the surface of the carbonaceous material particles and, therefore, the alloy particles have only a thin film of binder which does not damage the cell reaction on the alloy particles. To the contrary, if the surface area of the carbonaceous material particles is smaller, then the binder also collects on the alloy particles and, as a result, the cell reaction on the alloy particles may be damaged.

Another merit of using carbonaceous materials is that the carbon brings about a plating-stripping reaction with alkali metals to exhibit not only the binding action between the alkali metal alloy particles, but also the action of carbon per se as an anode active material. When capacity density and reversibility of various carbonaceous materials for the plating-stripping reaction with the alkali metal are examined, it has been found that carbonaceous materials of the higher oxygen content have the higher capacity density as shown in FIG. 1. For example, when the plating-stripping reaction of lithium was carried out using, as an electrode, carbonaceous material particles which contained 3.88 by weight of oxygen and which was prepared by thermal decomposition of a resin prepared by polymerizing furfuryl alcohol, the capacity density of a reversible plating-stripping reaction was 150 mAh/g. In the case of acetylene black containing 0.2% by weight of oxygen, the capacity density of the reversible plating-stripping reaction of lithium was 140 mAh/g. On the other hand, in the case of using graphite having an oxygen content of 0.01% by weight which is less than the limit of detection, the capacity density of the reversible plating-stripping reaction of lithium was 30 mAh/g.

Such effect of the functional group containing oxygen on the surface of carbon can be explained by considering the functional group containing oxygen on the surface to act as an adsorption site for the alkali metal ion. The amount of the surface functional group containing oxygen is preferably 0.1% by weight or more as mentioned above. When the amount of the surface functional group containing oxygen is more than 5% by weight, conductivity decreases and the function as a composite anode is adversely affected.

On the surface of the carbonaceous material particles there are functional groups such as phenol group (—OH), carbonyl group (—C=O) and ether group (—C—O—C—). Of the surface functional groups, the ether group appears to make interactions including movement of lithium ions and electric charge, in view of the behavior of alkali metal ions dissolved in an electrolyte, and trap lithium ions on the surface of the carbonaceous material particles, thereby assisting the intercalation of lithium ions in the alloy. The alkali metal ions dissolved in the electrolyte strongly interact with the ether group of dimethoxyethane, so that the ions solvate. On the other hand, the interaction between alkali metal ions and the carbonyl group of propylene carbonate and ethylene carbonate is too weak to make the solvation. Furthermore, the phenol group forms an ionic bond complex to fix the alkali metal ions and, therefore, it is not suitable as the surface functional group.

Accordingly, as starting materials to be thermally decomposed, materials such as phenol resins or acrylic resins capable of generating the phenol group or carbonyl group should not be chosen, but materials capable of forming the ether group should be chosen. Such starting materials may preferably be alcohols, glycols and furans having a cyclic ether.

The method for obtaining carbonaceous materials having the functional group containing oxygen on the surface includes, for example, a method of thermal decomposition of compounds selected from alcohols, glycols and furans having a cyclic ether and a method of oxidizing carbonaceous materials low in oxygen content.

The composite anode can be produced in the following manner. A known alkali metal alloy with aluminum, gallium, indium, tin, bismuth, lead or the like is prepared by metallurgical methods, electrochemical methods and the like and ground and classified in a size between 100 and 10 μm to make alloy powders. The resulting powders are mixed with carbonaceous powders having a size between 50 and 0.5 µm and to the mixture was added a solution prepared by dissolving 1 to 10 wt % of a copolymer mainly composed of 80 to 50 mol % of ethylene and 20 to 40 mol % of propylene as a binder in an aromatic solvent. The preferred contents of the alloy powders, carbonaceous powders and binder on the solvent-free basis are 85 to 95 wt %, 4 to 10 wt % and 1 to 5 wt %, respectively. The mixture is kneaded and coated on a current collector, and this is molded and dried to obtain an anode. When an organic compound is thermally decomposed, a lump of a carbonaceous material may be formed depending upon chosen thermal decomposition conditions and thus normal dry pulverizing methods may hardly produce fine carbonaceous material particles. In this case, the lump can be wet pulverized when it is kneaded together with the alloy as active material and the binder, to thereby obtain particles of a size suitable to fill the spaces between the alloy particles with the carbonaceous material particles. The mixing ratio of the alkali metal alloy and the carbonaceous material is suitably in the range of 0.2 to 1.0 in terms of the volume ratio of the carbonaceous material powders to the alloy particles in order that the carbonaceous material powders are filled in the space between the alloy particles to diminish the change in volume of the alloy particles caused by charging and discharging. The mixing ratio by weight must be obtained from the specific gravities of the alloy and carbon. According to this method, uniform electrodes can be mass produced by a simple apparatus and is effective for production of batteries in a practical scale.

Batteries are fabricated using the thus obtained composite anode combined with a cathode and filling an electrolyte solution. As the cathode, there may be used oxides or sulfides of manganese, molybdenum, titanium, vanadium, chromium, cobalt or the like. As the electrolyte solution, there may be used those which are prepared by dissolving in a polar organic solvent an electrolyte containing alkali metal ion such as $LiBF_4$, $NaBF_4$, $LiPF_6$, $NaPF_6$, $LiAsF_6$, $LiClO_4$, $NaClO_4$ or $LiCF_3SO_3$. The shapes of the electrode and the battery are not limited, but the present invention is especially suitable for application to cylindrical batteries which use the spirally wound electrode or large-sized batteries.

The action of the composite anode is explained below. The micro structure of the composite anode is such that carbonaceous material powders are filled in the space between the alkali metal alloy particles and these particles are bound by a binder comprising a copolymer mainly composed of ethylene and propylene. In this composite electrode, alkali metal ion is reduced to an alkali metal at the time of charging. The alkali metal rapidly diffuses into the alloy. The diffusion into the alloy results in increase of $M_1/M_2$ ratio in the alloy to cause decrease in the density of the alloy and expansion of the alloy particles. At the time of discharging, the alkali metal is oxidized on the surface of the alkali metal alloy particles and dissolves into the electrolyte solution as an alkali metal ion. Therefore, the $M_1/M_2$ ratio in the alkali metal alloy decreases and the volume of the alloy particles contracts. When the expansion-contraction of the alkali metal alloy particles which are active material is repeated by repeating charging and discharging in this way, collapse of the electrode body occurs in the case of using a plate-type alloy of monolithic structure as an anode. In the case of using an electrode made by press molding the alkali metal alloy particles, the change in volume can be moderated due to the space between the powder particles, but the similar collapse occurs when the anode utilization is increased.

In the composite anode, macroscopically the change in volume of the alkali metal alloy particles caused by charging and discharging is moderated by the carbonaceous material powders filled in the space between the particles and simultaneously the binder comprising a copolymer mainly composed of ethylene and propylene inhibits falling off of the particles of the active material from the electrode body. Furthermore, microscopically even when the alkali metal alloy particles undergo contraction in volume at the time of discharging and the direct contact between the alloy particles is lost, the carbonaceous material filled in the space between the alloy particles can maintain the electrical contact between the particles of the active material. Moreover, the carbonaceous material added can absorb or desorb the alkali metal ion with charging and discharging and can be allowed to act as a reserve of the alkali metal alloy for the charge-discharge reaction.

That is, when the alkali metal alloy which is an active material deteriorates at the time of charging and discharging and the capacity decreases, an active alkali metal is precipitated on the surface of the anode if carbonaceous material is not present and inactivation of the precipitated alkali metal occurs. On the other hand, when carbonaceous material is present in the composite anode, it inserts and extracts the alkali metal ion in place of the alkali metal alloy to prevent the plating-stripping of the alkali metal onto the surface of the alloy and takes over the charge-discharge reaction and thus, the inactivation of the anode can be inhibited. Especially, by specifying the oxygen content in the carbonaceous material to the range of from 1 to 5% by weight, the capacity density of oxygen-containing carbon for charging and discharging can be increased and this is effective for improving the life of the batteries.

The present invention will be illustrated by the following examples.

EXAMPLE 1

88% by weight of alloy particles prepared by grinding an alloy of lithium and lead (Li/Pb ratio=3.5) to a size of less than 77 µm and 9% by weight of acetylene black of less than 10 µm having an oxygen content of 0.2% by weight were mixed and to the mixture was added a solution prepared by dissolving an ethylene-propylene rubber in an amount of 3% by weight in xylene, thereby to obtain a paste. This paste was coated on a current collector and vacuum dried to make a composite anode. A battery was fabricated using the composite anode, an active material mainly composed of manganese dioxide as a cathode and a solution prepared by dissolving lithium hexafluorophosphate in a mixed solvent of propylene carbonate and 1,2-dimethoxyethane as an electrolyte solution. This battery was subjected to a charge-discharge test. In this case, the cathode capacity density was set at 150 mAh/g and the anode capacity density was set at 90 mAh/g (corresponding to 22% in terms of anode utilization) and charging and discharge were repeated at a current of 2 hour-rate. As a result, the cycle number before the discharge capacity decreased to ½ of the initial capacity was 380 cycles as shown in FIG. 1.

EXAMPLE 2

88% by weight of alloy particles prepared by grinding a β-phase of lithium and aluminum to a size of less than 77 µm was mixed with 9% by weight of carbon powders having an oxygen content of 3.8% by weight and having a size of less than 44 µm prepared by polymerizing furfuryl alcohol in an aqueous solution with sulfuric acid and then thermally decomposing the resulting polymer in a nitrogen atmosphere at 1000° C. and pulverizing; and to the resulting mixture was added a solution prepared by dissolving an ethylenepropylene rubber in an amount of 3% by weight in xylene to obtain a paste. This paste was coated on a current collector and vacuum dried to make a composite anode. A battery was fabricated using the composite anode, an active material mainly composed of manganese dioxide as a cathode and a solution prepared by dissolving lithium hexafluorophosphate in a mixed solvent of propylene carbonate and 1,2-dimethoxyethane as an electrolyte solution. This battery was subjected to a charge discharge test. In this case, the cathode capacity density was set at 150 mAh/g and the anode capacity density was set at 120 mAh/g (corresponding to 15% in terms of anode utilization) and charging and discharge were repeated at a current of 2 hour-rate. As a result, the cycle number before the discharge capacity decreased to ½ of the initial capacity was 280 cycles.

EXAMPLE 3

88% by weight of alloy particles prepared by grinding an alloy of lithium and indium (Li/In ratio=1.0) to less than 77 μm and 9% by weight of acetylene black of less than 10 μm having an oxygen content of 0.2% by weight were mixed and to the mixture was added a solution prepared by dissolving an ethylene-propylene rubber in an amount of 3% by weight in xylene, thereby to obtain a paste. This paste was coated on a current collector and vacuum dried to make a composite anode. A battery was fabricated using the composite anode, an active material mainly composed of manganese dioxide as a cathode and a solution prepared by dissolving lithium hexafluorophosphate in a mixed solvent of propylene carbonate and 1,2-dimethoxyethane as an electrolyte solution. This battery was subjected to a charge-discharge test. In this case, the cathode capacity density was set at 150 mAh/g and the anode capacity density was set at 45 mAh/g (corresponding to 20% in terms of anode utilization) and charging and discharge were repeated at a current of 2 hour-rate. As a result, the cycle number before the discharge capacity decreased to ½ of the initial capacity was 430 cycles.

EXAMPLE 4

88% by weight of alloy particles prepared by grinding an alloy of lithium and lead (Li/Pb ratio=3.4) to a size of less than 77 μmn was mixed with 9% by weight of carbonaceous material powders having an oxygen content of 3.8% by weight and having a size of less than 44 μm prepared by polymerizing furfuryl alcohol in an aqueous solution with sulfuric acid, then thermally decomposing the polymer in a nitrogen atmosphere at 1000° C. and pulverizing, and to the resulting mixture was added a solution prepared by dissolving an ethylene-propylene rubber in an amount of 3% by weight in xylene to obtain a paste. This paste was coated an a current collector and vacuum dried to make a composite anode. A battery was fabricated using the composite anode, an active material mainly composed of manganese dioxide as a cathode and a solution prepared by dissolving lithium hexafluorophosphate in a mixed solvent of propylene carbonate and 1,2-dimethoxyethane as an electrolyte solution. This battery was subjected to a charge-discharge test. In this case, the cathode capacity density was set at 150 mAh/g and the anode capacity density was set at 90 mAh/g (corresponding to 22% in terms of anode utilization) and charging and discharge were repeated at a current of 2 hour-rate. As a result, the cycle number before the discharge capacity decreased to ½ of the initial capacity was 320 cycles as shown in FIG. 1.

EXAMPLE 5

An anode was made in the same manner as in Example 4 from 88% of particles of a lithium-lead alloy having a Li/Pb=3.4 obtained by pulverizing the alloy having a Li/Pb= 3.5 to less than 77 μm and 9% of particles of a carbonaceous material having an oxygen content of 4.5% obtained by thermally decomposing polyethylene glycol in a nitrogen atmosphere at 1000° C. and pulverizing to less than 44 μm. Then, a battery was prepared using the anode above in the same manner as in Example 1. The battery was subjected to a charge-discharge test. The cycle number before the discharge capacity decreased to ½ of the initial capacity was 340 as shown in FIG. 1.

EXAMPLE 6

An anode was made in the same manner as in Example 1 from 91% of particles of a lithium-lead alloy obtained by pulverizing the alloy having a Li/Pb=3.5 to less than 77 μm and 6% of acetylene black of less than 10 μm in size. Then, a battery was prepared using the anode above in the same manner as in Example 1. The battery was subjected to a charge-discharge test. The cycle number before the discharge capacity decreased to ½ of the initial capacity was 400.

Comparative Example 1

Alloy particles prepared by grinding an alloy of lithium and lead (Li/Pb ratio=3.5) to a size of less than 77 μm were press molded under a pressure of 200 kg/cm$^2$ to make an anode. A battery was fabricated using the anode, an active material mainly composed of manganese dioxide as a cathode and a solution prepared by dissolving lithium hexafluorophosphate in a mixed solvent of propylene carbonate and 1,2-dimethoxyethane as an electrolyte solution. This battery was subjected to a charge-discharge test. In this case, the cathode capacity density was set at 150 mAh/g and the anode capacity density was set at 90 mAh/g (corresponding to 22% in terms of anode utilization) and charging and discharge were repeated at a current of 2 hour-rate. As a result, the cycle number before the discharge capacity decreased to ½ of the initial capacity was 120 cycles.

Comparative Example 2

88% by weight of alloy particles prepared by grinding an alloy of lithium and lead (Li/Pb ratio=3.5) to less than 77 μm was mixed with 9% by weight of graphite powder of less than 44 μm and to the resulting mixture was added a solution prepared by dissolving an ethylene-propylene rubber in an amount of 3% by weight in xylene to obtain a paste. This paste was coated on a current collector and vacuum dried to make a composite anode. A battery was fabricated using the composite anode, an active material mainly composed of manganese dioxide as a cathode and a solution prepared by dissolving lithium hexafluorophosphate in a mixed solvent of propylene carbonate and 1,2-dimethoxyethane as an electrolyte solution. This battery was subjected to a charge-discharge test. In this case, the cathode capacity density was set at 150 mAh/g and the anode capacity density was set at 90 mAh/g (corresponding to 228 in terms of anode utilization) and charging and discharge were repeated at a current of 2 hour-rate. As a result, the cycle number before the discharge capacity decreased to ½ of the initial capacity was 200 cycles as shown in FIG. 1.

Comparative Example 3

An anode was made in the same manner as in Example 4 from 88% of particles of a lithium-lead alloy obtained by pulverizing the alloy having a Li/Pb=3.5 to less than 77 μm and 9% of particles of a carbonaceous material having an oxygen content of 3.0% by weight obtained by thermally decomposing a phenol resin in a nitrogen atmosphere at 1000° C. and pulverizing to less than 44 μm. Then, a battery was prepared using the anode above in the same manner as in Example 1. The battery was subjected to a charge-discharge test. The cycle number before the discharge capacity decreased to ½ of the initial capacity was 250.

Comparative Example 4

An anode was made in the same manner as in Example 4 from 88% of particles of a lithium-lead alloy obtained by pulverizing the alloy having a Li/Pb=3.5 to less than 77 μm and 9% of particles of a carbonaceous material having an oxygen content of 3.0% by weight obtained by thermally decomposing an acrylic resin in a nitrogen atmosphere at 1000° C. and pulverizing to less than 44 μm. Then, a battery was prepared using the anode above in the same manner as in Example 1. The battery was subjected to a charge-discharge test. The cycle number before the discharge capacity decreased to ½ of the initial capacity was 240.

According to the present invention, by applying a composite anode comprising a pulverized alkali metal alloy, a carbonaceous material powder containing oxygen atoms and a binder comprising a copolymer of monomers mainly composed of ethylene and propylene to a nonaqueous secondary battery containing an alkali metal as an anode active material, collapse of the anode and deterioration in performance of the anode caused by charging and discharging can be inhibited and thus, a nonaqueous secondary battery excellent in charge-discharge cycle life can be obtained.

What is claimed is:

1. A composite anode comprising a particulate alkali metal alloy, carbonaceous material powder and binder for nonaqueous secondary batteries in which an alkali metal is used as an anode active material and a solution of an electrolyte salt in an organic solvent is used as an electrolyte, said carbonaceous material powder filling spaces between the alkali metal alloy particles, the size of alkali metal alloy particles being larger than the size of the carbonaceous material powder, the particles and powder being interconnected by the binder and the mixing ratio of the carbonaceous material powder and the alkali metal alloy is in the range of 0.2 to 1.0 in terms of the volume ratio of the carbonaceous material powder to the alloy powder; said carbonaceous material containing oxygen atoms with the content of oxygen being in the range of from 1 to 5% by weight, and being prepared by the thermal decomposition of an oxygen-containing organic compound selected from the group consisting of alcohols, glycols and furans containing a cyclic ether group in an inert atmosphere.

2. A composite anode according to claim 1, wherein the binder comprises a copolymer of ethylene and propylene.

3. A composite anode according to claim 2, wherein the carbonaceous material powder containing oxygen atoms is obtained by heat treating carbonaceous material of low oxygen content in an oxidizing atmosphere.

4. A composite anode according to claim 1, wherein the binder is admixed with the alloy particles and the powder as a solution of a copolymer of ethylene and propylene dissolved in an aromatic solvent.

5. A nonaqueous secondary battery comprising a combination of the composite anode for nonaqueous secondary batteries according to claim 1, a cathode and a solution of the electrolyte salt in the organic solvent as the electrolyte.

6. A composite anode according to claim 1, wherein the alkali metal alloy contains lithium and a metal selected from the group consisting of aluminum, gallium, indium, tin, bismuth and lead.

7. A composite anode according to claim 1, wherein the electrolyte salt is selected from the group consisting of $LiBF_4$, $NaBF_4$, $LiPF_6$, $NaPF_6$, $LiAsF_6$, $LiClO_4$, $NaClO_4$ and $LiCF_3SO_3$ and the organic solvent is 1, 2-dimethoxyethane, propylene carbonate, or a mixture thereof.

* * * * *